(12) United States Patent
Takeuchi et al.

(10) Patent No.: US 11,766,890 B2
(45) Date of Patent: Sep. 26, 2023

(54) IN-WHEEL MOTOR DRIVE DEVICE

(71) Applicant: NTN CORPORATION, Osaka (JP)

(72) Inventors: Naoya Takeuchi, Shizuoka (JP); Shiro Tamura, Shizuoka (JP); Shinya Taikou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 1104 days.

(21) Appl. No.: 16/476,907

(22) PCT Filed: Jan. 16, 2018

(86) PCT No.: PCT/JP2018/000963
§ 371 (c)(1),
(2) Date: Jul. 10, 2019

(87) PCT Pub. No.: WO2018/135470
PCT Pub. Date: Jul. 26, 2018

(65) Prior Publication Data
US 2020/0384804 A1    Dec. 10, 2020

(30) Foreign Application Priority Data

Jan. 18, 2017  (JP) ................................ 2017-006639

(51) Int. Cl.
*B60B 27/00* (2006.01)
*B60K 7/00* (2006.01)
(Continued)

(52) U.S. Cl.
CPC ...... *B60B 27/0078* (2013.01); *B60B 27/0015* (2013.01); *B60B 27/0052* (2013.01);
(Continued)

(58) Field of Classification Search
CPC ............ B60B 27/0078; B60B 27/0015; B60B 27/0052; B60B 27/0094; B60B 35/14; B60K 7/0007
See application file for complete search history.

(56) References Cited

U.S. PATENT DOCUMENTS

| | | |
|---|---|---|
| 2005/0061565 A1 | 3/2005 | Mizutani et al. |
| 2007/0193791 A1 | 8/2007 | Komatsu |
| (Continued) | | |

FOREIGN PATENT DOCUMENTS

| | | |
|---|---|---|
| CN | 102648362 | 8/2012 |
| CN | 102666171 | 9/2012 |
| (Continued) | | |

*Primary Examiner* — James A Shriver, II
*Assistant Examiner* — Michael T. Walsh
(74) *Attorney, Agent, or Firm* — Clark & Brody LP (57) ABSTRACT

An in-wheel motor drive device (10) includes a wheel hub bearing unit (11) having an outer ring (13), an inner ring (12) protruding from the outer ring to one side in an axial (O) direction, rolling elements (14) between the outer ring and the inner ring, and a fixing bolt (15) for fixing the outer ring to a non-rotary member (102); and a brake disk (55) having a connecting portion (58) configured to connect with one end of the inner ring, a cylindrical portion (57) extending from the connecting portion to the other side in the axial direction and disposed coaxially to the inner ring, and at least a part of the fixing bolt is received in an internal space of the cylindrical portion.

3 Claims, 5 Drawing Sheets

(51) Int. Cl.
*F16D 65/12* (2006.01)
*B60B 35/14* (2006.01)

(52) U.S. Cl.
CPC .......... *B60B 27/0094* (2013.01); *B60B 35/14* (2013.01); *B60K 7/0007* (2013.01); *F16D 65/12* (2013.01); *B60B 2380/12* (2013.01); *B60B 2380/75* (2013.01); *B60K 2007/0038* (2013.01); *B60K 2007/0061* (2013.01)

(56) References Cited

U.S. PATENT DOCUMENTS

| | | | | |
|---|---|---|---|---|
| 2011/0011656 | A1* | 1/2011 | Poulsen | B60L 50/16 |
| | | | | 903/909 |
| 2018/0272855 | A1* | 9/2018 | Tamura | B60B 35/14 |
| 2018/0272865 | A1* | 9/2018 | Fukudome | B60K 17/043 |
| 2018/0294692 | A1* | 10/2018 | Sato | H02K 7/116 |
| 2018/0334002 | A1* | 11/2018 | Kato | B60G 3/20 |
| 2019/0111747 | A1* | 4/2019 | Ishikawa | B60G 11/16 |
| 2019/0193504 | A1* | 6/2019 | Yamada | B60G 3/20 |
| 2019/0232747 | A1* | 8/2019 | Tamura | F16H 57/021 |
| 2019/0263215 | A1* | 8/2019 | Shibuya | B60K 7/0007 |
| 2020/0384856 | A1* | 12/2020 | Wang | H02K 7/1025 |
| 2021/0104942 | A1* | 4/2021 | Katsuta | H02K 1/28 |
| 2021/0394610 | A1* | 12/2021 | Kim | B60G 11/16 |
| 2022/0048317 | A1* | 2/2022 | Takeuchi | B60B 27/0052 |

FOREIGN PATENT DOCUMENTS

| | | | | |
|---|---|---|---|---|
| CN | 102666172 | | 9/2012 | |
| EP | 3 045 336 | | 7/2016 | |
| EP | 3045336 | A1 * | 7/2016 | .......... B60K 17/043 |
| JP | 2008174021 | A * | 7/2008 | |
| JP | 2008-273406 | | 11/2008 | |
| JP | 2008273406 | A * | 11/2008 | |
| JP | 2009-012569 | | 1/2009 | |
| JP | 2009012569 | A * | 1/2009 | |
| JP | 2011185286 | A * | 9/2011 | |
| JP | 2012-148726 | | 8/2012 | |
| JP | 2012148726 | A * | 8/2012 | .......... B60K 17/043 |
| JP | 2015-147491 | | 8/2015 | |
| JP | 2015147491 | A * | 8/2015 | |
| JP | 5866950 | | 2/2016 | |
| WO | WO-2012120651 | A1 * | 9/2012 | ............ B60B 35/18 |

* cited by examiner

FIG. 1

Outer side in vehicle width direction ← → Inner side in vehicle width direction

Outer side in vehicle width direction ← → Inner side in vehicle width direction

IN-WHEEL MOTOR DRIVE DEVICE

TECHNICAL FIELD

The present invention relates to an in-wheel motor drive device including a wheel hub bearing unit coupled to a wheel, and particularly relates to a fixing bolt for fixing a stationary outer ring of the wheel hub bearing unit to a non-rotary counter member.

BACKGROUND ART

A known in-wheel motor disposed in an inner space area of a wheel and which drives that wheel is, for example, one described in Japanese Patent No. 5866950 (Patent Document 1). Patent Document 1 discloses a rotary inner ring driven by a motor, a stationary outer ring configuring a hub bearing together with the rotary inner ring, a brake disk attached to the rotary inner ring, and a wheel. The stationary outer ring is fixed to the motor case with a bolt extending parallel to an axle.

CITATION LIST

Patent Literatures

[Patent Document 1] Japanese Patent No. 5866950

SUMMARY OF INVENTION

Technical Problem

The in-wheel motor is preferably small in size to fit within the inner space area of the wheel as much as possible. If the in-wheel motor protrudes out from the inner space area of the wheel, a wheel house that houses the wheel needs to be enlarged, thereby sacrificing the cabin space. Moreover, the protruding portion of the in-wheel motor may interfere with the suspension device.

The bolt of Patent Document 1 described above is disposed on an inner side in the vehicle width direction opposite the brake disk and in the space a between the bolt head and a frictional surface of the brake disk in an axial direction (vehicle width direction). Therefore, the in-wheel motor is disposed on the inner side in the vehicle width direction opposite the brake disk and protrudes to the inner side in the vehicle width direction from the inner space area of the wheel.

In view of the aforementioned actual conditions, an object of the present invention is to provide a technique in an in-wheel motor including a brake disk to reduce the dimension in an axial direction from the brake disk to the in-wheel motor.

Solution to Problem

In order to attain the object, an in-wheel motor drive device according to the present invention includes: a wheel hub bearing unit having an outer ring, an inner ring passing through a center hole of the outer ring and protruding from the outer ring to one side in an axial direction, a plurality of rolling elements disposed in double rows in an annular space between the outer ring and the inner ring, and fixing means for fixing the outer ring to a non-rotary member; a motor unit configured to drive the inner ring; and a brake disk having a connecting portion configured to connect with one end of the inner ring in the axial direction, a cylindrical portion extending from the connecting portion to the other side in the axial direction and disposed coaxially to the inner ring, and a flange-shaped friction disk portion extending towards an outer diameter from the other end of the cylindrical portion in the axial direction, and at least a part of the fixing means is received in an internal space of the cylindrical portion.

According to the present invention, at least a part of the fixing bolt that couples and fixes the outer ring to the non-rotary member is received within the internal space of the cylindrical portion of the brake disk; thus, in terms of position in the axial direction, the brake disk and the fixing bolt are disposed overlapping each other. This eliminates the need to provide a clearance in the axial direction between the friction disk portion of the brake disk and the fixing bolt, which allows for reducing the dimension in the axial direction of the in-wheel motor drive device including a brake disk compared to the conventional art. It is a matter of course that the fixing bolt is disposed closer to the inner diameter than the inner peripheral surface of the cylindrical portion.

The outer ring may be one member, or may be two members coupled to each other. The outer ring as one embodiment of the present embodiment includes an outer ring tubular member that surrounds an other end of the inner ring in the axial direction, and an outer attachment member fixed to an outer periphery of the outer ring tubular member, the fixing means fixing the outer ring attachment member to the non-rotary member, and at least a part of the outer attachment member being received inside the internal space of the cylindrical portion. According to such an embodiment, in terms of position in the axial direction, since the outer ring attachment member and the friction disk portion of the brake disk are disposed in an overlapped manner, it is possible to further shorten the dimension in the axial direction of the in-wheel motor drive device including a brake disk as compared to the conventional art. As another embodiment, the outer ring attachment member is disposed on the other side in the axial direction of the cylindrical portion and a part of the fixing bolt is disposed in the internal space of the cylindrical portion.

The shape and structure of the fixing means are not particularly limited. As a preferable embodiment of the present invention, the fixing means is a fixing bolt and includes a head disposed on one side of the outer ring in the axial direction and a shank extending from the head to the other side in the axial direction and being passed through a hole formed in the outer ring and a hole formed in the non-rotary member, and at least a part of the head of the fixing bolt is received inside the internal space. According to such an embodiment, no clearance needs to be provided in the axial direction between the friction disk portion of the brake disk and the bolt head, thus allowing for reducing the dimension in the axial direction of the in-wheel motor drive device including a brake disk as compared to the conventional art. As another embodiment, a shank of the fixing bolt may be directed to the one side in the axial direction, and the head of the fixing bolt may be directed to the other side in the axial direction. The shank of the fixing bolt may screw to the outer ring or non-rotary member, or may screw with a nut and fix by compressing the outer ring and the non-rotary member with the nut and the fixing bolt.

The in-wheel motor drive device preferably includes a reducer unit configured to reduce a rotation of the motor, and the wheel hub bearing unit of the in-wheel motor drive device couples to the reducer unit or couples to the motor unit. More specifically, the non-rotary outer ring couples to a casing of the reducer unit, or a motor casing of the motor unit. These casings constitute a casing of the in-wheel motor drive device. The outer ring and the casing of the in-wheel motor drive device are coupled to the vehicle body via a suspension device. As a further preferable embodiment of the present invention, the non-rotary member is a suspension member. According to such an embodiment, the outer ring can be fixed to the suspension device with the fixing bolt. The suspension device is not particularly limited and may be a strut suspension device or a double wishbone suspension device.

As another embodiment of the present invention, the non-rotary member is a casing of a reducer unit that transmits rotation from the motor unit to the inner ring upon reducing speed of the rotation. According to such an embodiment, the outer ring can be fixed to the casing of the in-wheel motor drive device with a fixing bolt. The fixing bolt may be one coupling the three members, that is, the outer ring, the suspension member, and the casing.

Advantageous Effects of Invention

As such, according to the present invention, the dimension in the axial direction from the brake disk to the in-wheel motor drive device can be reduced in size. Most parts of the in-wheel motor drive device will be received inside the inner space area of the wheel, so there is no need to increase the size of the wheel house to accommodate the wheel provided with the in-wheel motor drive device, and the cabin space will not be sacrificed. Moreover, even if the wheel provided with the in-wheel motor drive device bounds or rebounds in a vertical direction, interference between the in-wheel motor drive device and the suspension device is easily avoidable. Alternatively, even if the wheel provided with the in-wheel motor drive device changes course, the interference between the in-wheel motor drive device and the suspension device is easily avoidable.

DESCRIPTION OF EMBODIMENTS

Figure 1:
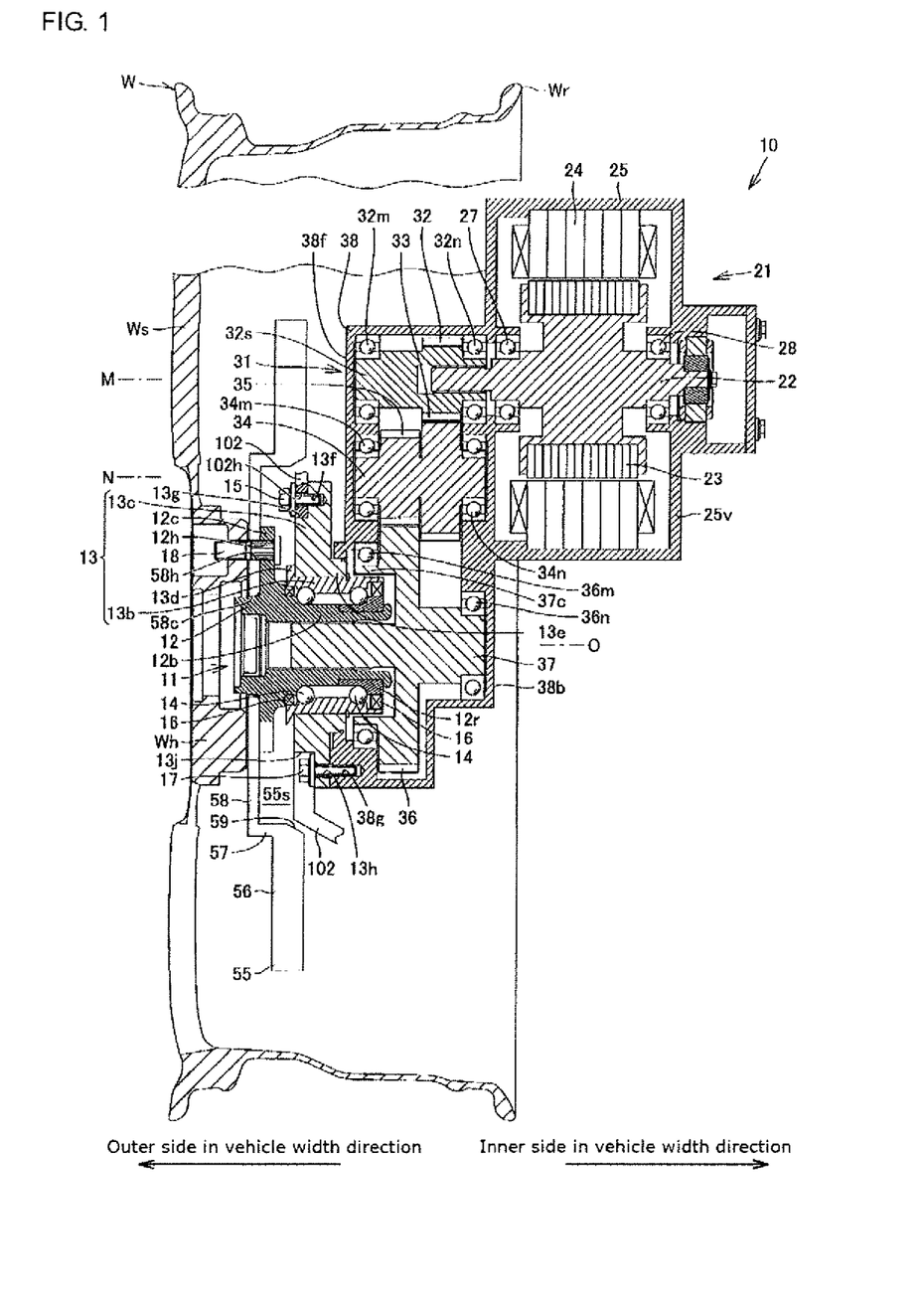
FIG. 1 is a developed sectional view showing an in-wheel motor drive device serving as one embodiment of the present invention.
Figure 2:
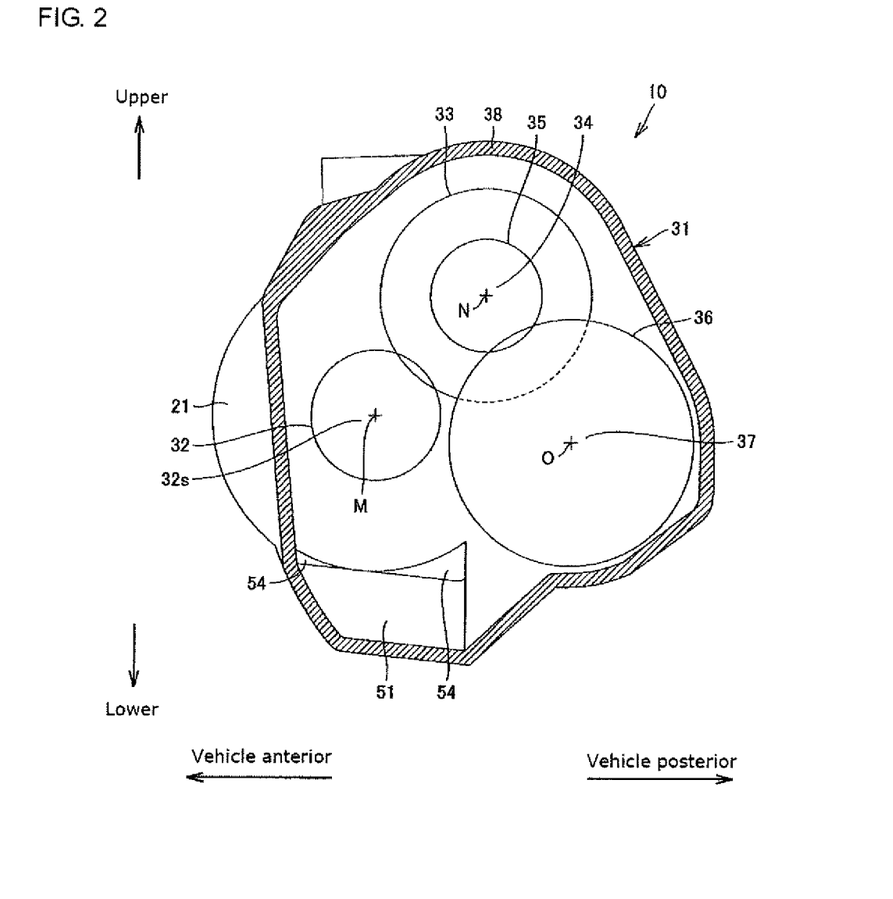
FIG. 2 is a cross sectional view schematically showing the same embodiment.

An embodiment of the present invention is described hereinafter in detail, with reference to the drawings. FIG. 1 is a developed sectional view showing an in-wheel motor drive device according to the present invention. FIG. 2 is a cross sectional view schematically showing the same embodiment, and represents a state viewed from an outer side in a vehicle width direction. In FIG. 1, the left side of the drawing serves as the outer side (outboard side) in the vehicle width direction, and the right side of the drawing serves as an inner side (inboard side) in the vehicle width direction. In the following description, the outer side in the vehicle width direction is also called one side in an axial direction, and the inner side in the vehicle width direction is also called the other side in the axial direction. In FIG. 2, an upper side in the drawing serves as an upper side of the vehicle, a lower side in the drawing serves as a lower side of the vehicle, a left side in the drawing serves as a front side in the vehicle, and a right side in the drawing serves as a rear side of the vehicle. The front side of the vehicle is an advancing direction of the vehicle. The rear side of the vehicle is a reversing direction of the vehicle.

An in-wheel motor drive device 10 includes a wheel hub bearing unit 11 provided in the center of the wheel W, a motor unit 21 that drives the wheel, and a reducer unit 31 that transmits a rotation of the motor unit to the wheel hub bearing unit 11 upon reducing speed of the rotation. The motor unit 21 and the reducer unit 31 are disposed offset from an axis O serving as a center axis of the wheel hub bearing unit 11. The axis O extends in the vehicle width direction and corresponds to the axle. In terms of position in the axis O direction, the wheel hub bearing unit 11 is disposed on the one side (outboard side) of the in-wheel motor drive device 10 in the axial direction, the motor unit 21 is disposed on the other side (inboard side) of the in-wheel motor drive device 10 in the axial direction, and the reducer unit 31 is disposed in a center part of the in-wheel motor drive device in the axial direction. The wheel hub bearing unit 11 and the reducer unit 31 are housed inside a wheel inner space area partitioned into a rim portion Wr and a spoke portion Ws of the wheel W. The motor unit 21 protrudes to the other side in the axial direction from the wheel inner space area.

As shown in FIG. 1, the wheel hub bearing unit 11 is to have a rotary inner ring and a stationary outer ring, and has an inner ring 12 as a hub ring coupling to a hub portion Wh of the wheel W, a non-rotary outer ring 13 disposed coaxially to the inner ring 12 on an outer diameter side thereof, and a plurality of rolling elements 14 disposed in an annular space between the inner ring 12 and the outer ring 13.

The outer ring 13 is a stationary ring including an outer ring tubular member 13b and an outer ring attachment member 13c. The outer ring attachment member 13c is a plate material made of steel having a through-hole in its center part, and the outer ring tubular member 13b made of steel is fixed to the through-hole by press-fit or with a bolt. This thus makes the outer ring attachment member 13c function as an outer ring flange. If fixed with a bolt, a female threaded hole may be provided in one of the outer ring tubular member 13b and the outer ring attachment member 13c, and the remaining other one may be provided with a through-hole, to pass the bolt though the through-hole and screw it to the female threaded hole. The center part of the outer ring attachment member 13c is formed with a tube portion 13e protruding to the other side in the axis O direction along the through-hole. The tube portion 13e fits with the outer ring tubular member 13b on its inner peripheral surface. Moreover, the tube portion 13e fits with an opening formed in a front part 38f described later on its outer peripheral surface. A projection 13d protruding to the outer diameter side is formed on one end of the outer ring tubular member 13b in the axis O direction. The projection 13d restricts the outer ring attachment member 13c from moving towards the one side in the axis O direction. As a modification not illustrated, the outer ring tubular member 13b and the outer ring attachment member 13c may be formed integrally.

A plurality of female threaded holes 13f and through-holes 13h are opened spaced apart in a circumferential direction in the outer ring attachment member 13c serving as the outer flange. For example, the female threaded holes 13f and the through-holes 13h are disposed alternately in predetermined intervals in the circumferential direction. Each of the female threaded holes 13f and the through-holes 13h extend parallel to the axis O, and bolts 15, 17 are passed therethrough from one side in the axis O direction. Shanks of the bolts 15 pass through a through-hole 102h of a suspension member 102, and screws to the female threaded hole 13f. Heads of the bolts 15 protrude from the suspension member 102 on the one side in the axis O direction. An outer edge of the outer ring attachment member 13c is formed with a cutout 13g of a predetermined shape that receives and engages with the suspension member 102. Alternatively, as in the specific example described later, the suspension member 102 may be made into plane contact with one end plane on the one side in the axis O direction of the outer ring attachment member 13c.

In FIG. 1, just one portion of the suspension member 102 is represented, and the remaining portion is omitted in illustration. The non-illustrated remaining portion of the suspension member 102 detours about the in-wheel motor drive device 10 and extends to the inner side in the vehicle width direction, and connects to a vehicle body not illustrated.

The shanks of the bolts 17 pass through the through-holes 13h, and screw to the female threaded holes 38g opened in a front part 38f of a body casing 38. The heads of the bolts 17 are positioned at cutouts 13j formed on the outer edge of the outer ring attachment member 13c. This thus allows for the outer ring 13 to be attached and fixed to the body casing 38. Moreover, the body casing 38 is supported by the suspension member 102 via the outer ring 13. The front part 38f is a casing wall part that covers one end of the reducer unit 31 in the axis O direction. The suspension member 102 is a non-rotary member, as with the outer ring 13 and the body casing 38. In comparison, the inner ring 12 is a rotary member that integrally rotates with the wheel W.

The inner ring 12 is a rotary ring including an inner ring tubular portion 12b and an inner ring flange 12c. The inner ring tubular portion 12b is a tubular body longer than the outer ring 13, and is passed through the center hole of the outer tubular member 13b. The inner flange 12c is formed on one end of the inner ring tubular portion 12b in the axis O direction, which protrudes from the outer ring 13 to outside the in-wheel motor drive device 10. The inner ring flange 12c constitutes a coupling seat unit for coupling coaxially to a brake disk 55 and the wheel (wheel W). The inner ring flange 12c of the present embodiment is not round and is cut out in predetermined intervals in the circumferential direction. The inner ring 12 couples to the wheel W at the inner ring flange 12c and rotates integrally with the wheel.

The inner ring tubular portion 12b protrudes from the inner ring flange 12c to the other side in the axis O direction. A plurality of rows of rolling elements 14 are disposed in an annular space between an outer peripheral surface in the other area of the inner ring tubular portion 12b in the axis O direction and the inner peripheral surface of the outer ring tubular member 13b. The outer peripheral surface of the center part of the inner ring tubular portion 12b in the axis O direction constitutes an inner raceway surface of a first row of the rolling elements 14. An inner raceway ring 12r fits to the outer periphery in the other end of the inner ring tubular portion 12b. The outer peripheral surface of the inner raceway ring 12r constitutes an inner raceway surface of a second row of the rolling elements 14. A sealing material 16 further interposes in the annular space between the inner ring tubular portion 12b and the outer ring tubular member 13b. The sealing member 16 seals both ends of the annular space to prevent intrusion of dust and foreign substances. An output shaft 37 of the reducer unit 31 is inserted into a center hole of the other end of the inner ring tubular portion 12b in the axis O direction, for spline fitting.

The motor unit 21 has a motor rotary shaft 22, a rotor 23, a stator 24, and a motor casing 25, and are successively disposed in this order from an axis M of the motor unit 21 towards an outer diameter side. The motor unit 21 is a radial gap motor of an inner rotor, outer rotor type, however this may be any other type. For example, although not illustrated, the motor unit 21 may be an axial gap motor.

The axis M serving as a center of rotation for the motor rotary shaft 22 and the rotor 23 extends parallel to the axis O of the wheel hub bearing unit 11. That is, the motor unit 21 is disposed offset and away from the axis O of the wheel hub bearing unit 11. More specifically, as shown in FIG. 2, the axis M of the motor unit is disposed anterior of the vehicle than the axis O.

Returning back to FIG. 1, the motor casing 25 is of a substantially cylindrical shape; it integrally couples to the body casing 38 on one end in the axis M direction, and the other end in the axis M direction is sealed with a plate-shaped motor casing cover 25v. Both ends of the motor rotary shaft 22 are supported freely rotatable to the body casing 38 and the motor casing cover 25v via the rolling bearings 27, 28. The body casing 38, the motor casing 25, and the motor casing cover 25v constitute the casing of the in-wheel motor drive device 10. The motor unit 21 drives the inner ring 12.

The reducer unit 31 is a triple-shaft parallel shaft gear reducer, including an input shaft 32s coupling coaxially to the motor rotary shaft 22 of the motor unit 21, an input gear 32 provided coaxially to an outer peripheral surface of the input shaft 32s, a plurality of intermediate gears 33 and 35, an intermediate shaft 34 that couples to the center of these intermediate gears 33 and 35, an output shaft 37 coupling coaxially to the inner ring 12 of the wheel hub bearing unit 11, an output gear 36 provided coaxially to an outer peripheral surface of the output shaft 37, and the body casing 38 that houses these plurality of gears and rotary shafts. The input shaft 32s extends along the axis M, the intermediate shaft 34 extends along an axis N, and the output shaft 37 extends along the axis O.

The input gear 32 is an external gear of a small diameter, and is a multiple number of teeth formed on an outer periphery of the input shaft 32s disposed along the axis M on the other end in the axis M direction. A center hole extending along the axis M is formed on the other end of the input shaft 32 in the axial direction, and is inserted to the one end of the motor rotary shaft 22 in the axis direction to fit in a relatively non-rotatable manner. The input shaft 32s is supported freely rotatable to the front part 38f and a rear part 38b of the body casing 38 on both ends of the input gear 32, via rolling bearings 32m and 32n.

The intermediate shaft 34 of the reducer unit 31 extends parallel to the axis O, and both ends of the intermediate shaft 34 are supported freely rotatable to the front part 38f and the rear part 38b of the body casing 38, via bearings 34m and 34n. A first intermediate gear 33 and a second intermediate gear 35 are provided coaxially in the center part of the intermediate shaft 34. The first intermediate gear 33 and the second intermediate gear 35 are external helical gears, and a diameter of the first intermediate gear 33 is greater than a diameter of the second intermediate gear 35. The first intermediate gear 33 is disposed on the other side in the axis N direction than the second intermediate gear 35, and meshes with the input gear 32. The second intermediate gear 35 is disposed on the one side in the axis N direction than the first intermediate gear 33, and meshes with the output gear 36.

The axis N of the intermediate shaft 34 is disposed above the axis O and the axis M, as shown in FIG. 2. Moreover, the axis N of the intermediate shaft 34 is disposed in the vehicle anterior of the axis O and in the vehicle posterior of the axis M. The reducer unit 31 can be understood as being a triple-shaft parallel shaft gear reducer having the axes O, N, M extending parallel to each other.

Returning back to FIG. 1, the output gear 36 is an external gear, and is provided coaxially to the center part of the output shaft 37. The output shaft 37 extends along the axis O. The one end of the output shaft 37 in the axis O direction is inserted into the center hole of the inner ring 12 and is fixed in a relatively non-rotatable manner. Such fitting is spline fitting or serration fitting. The tooth tip and tooth root of the output gear 36 are greater in diameter than the inner ring flange 12c of the inner ring 12, however an addendum circle of the output gear 36 is smaller than the outer ring attachment member 13c. The one end of the output gear 36 in the axis O direction is supported freely rotatable on the front part 38f of the body casing 38 via a rolling bearing 36m. The other end of the output shaft 37 in the axis O direction is supported freely rotatable to the rear part 38b of the body casing 38 via a rolling bearing 36n.

The reducer unit 31 reduces the rotation of the motor rotary shaft 22 by a meshing of the driving gear of the smaller diameter and the driven gear of the larger diameter, that is, the meshing of the input gear 32 with the first intermediate gear 33, and the meshing of the second intermediate gear 35 with the output gear 36, and transmits this to the output shaft 37.

The body casing 38 includes a tube-shaped part, and the front part 38f and the rear part 38b covering both edges of the tube-shaped part. The tube-shaped part covers the reducer unit 31 so as to surround the axes O, N, M extending in parallel to each other. The front part 38f covers one side of the reducer unit 31 in the axial direction. The rear part 38b covers the other side of the reducer unit 31 in the axial direction. The rear part 38b of the body casing 38 couples to the motor casing 25 and is also a partition partitioning the reducer unit 31 and the motor unit 21. The motor casing 25 is supported by the body casing 38 and protrudes to the other side from the body casing 38 in the axial direction.

The body casing 38 houses all the rotary elements (rotary shafts and gears) of the reducer unit 31. As shown in FIG. 2, the lower part of the body casing 38 serves as an oil storage unit 51. The oil storage unit 51 occupying the lower part of the reducer unit 31 stores lubricant oil that lubricates the motor unit 21 and the reducer unit 31. An opening 54 penetrating through the rear part 38b is formed upper of the oil storage unit 51. The opening 54 communicates an internal space of the reducer unit 31 with an internal space of the motor unit. 21

As shown in FIG. 1, the input shaft 32s, the intermediate shaft 34, and the output shaft 37 are supported from both sides by the aforementioned rolling bearings. In terms of position in the axial directions of the axes M, N, and O parallel to each other, the positions in the axial directions of the rolling bearings 32m, 34m and 36m on the one side in the axial direction overlap with each other. More preferably as shown in FIG. 1, the positions of these rolling bearings 32m, 34m and 36m in the axial directions all match. The positions in the axial directions of the rolling bearings 32n, 34, and 36n on the other side in the axial direction overlap with each other. More preferably, these positions in the axial directions of the rolling bearings 32n, 34n, and 36n all match. The second intermediate gear 35 and the output gear 36 are disposed on the one side in the axial direction, and positions of these gears in the axial directions overlap with each other. More preferably, the positions of these gears in the axial direction match. The input gear 32 and the first intermediate gear 33 are disposed on the other side in the axial direction, and the positions of these gears in the axial direction overlap with each other. More preferably, the positions of these gears in the axial direction all match. This allows for reducing the dimension in the axial direction of the reducer unit 31.

As shown in FIG. 1, the brake disk 55 is connected to the inner ring 12. The brake disk 55 is shaped as like a brimmed hat (hat shape), and includes a friction disk portion 56 corresponding to the brim part of the brimmed hat, a cylindrical portion 57 defining an internal space of the brimmed hat, and a connecting portion 58 corresponding to a crown of the brimmed hat.

The cylindrical portion 57 is disposed coaxially to the inner ring 12, and extends along the axis O. The inner diameter of the cylindrical portion 57 is greater than the outer diameter of the inner ring 12 and the outer diameter of the outer ring 13, particularly greater than the outer diameter of the inner ring flange 12c and the outer diameter of the outer ring attachment member 13c.

The connecting portion 58 is formed as a disk protruding to the inner diameter side from one end of the cylindrical portion 57 in the axis O direction, or alternatively radially like a spoke. A center hole 58c is formed in the center of the connecting portion 58, where the one end of the inner tubular portion 12 in the axis O direction is passed through. The connecting portion 58 has through-holes 58h extending parallel to the axis O formed spaced out with intervals in a circumferential direction, and the inner ring flange 12c also has through-holes 12h that extend parallel to the axis O formed in the same arrangement. In a state where these through-holes 12h and 58h correspond to each other, bolts 18 are inserted into the through-holes 12h and 58h from the other side in the axis O direction. The bolts 18 are fixed to the inner ring flange 12c on the other side in the axis O direction by press-fitting. The shank of the bolts 18 are formed with a larger diameter at their root parts, and their tip parts are formed with a smaller diameter with a male thread. The bolts 18 are fixed to the inner ring flange 12c on the other side in the axis O direction by press-fitting, and further are fixed to the connecting portion 58 on the one side in the axis O direction. Furthermore, the tip parts of the shanks of the bolts 18 pass through through-holes formed in the hub portion Wh on the one side in the axis O direction. By fastening a tapered nut not illustrated on the tip part of the bolts 18 at this state, the wheel W is attached and fixed to the inner ring 12.

The bolt 18 is disposed on the one side in the axis O direction opposite the outer ring 13; with the connecting portion 58 serving as a side opposite the outer ring 13 to the one side in the axis O direction, and with the friction disk portion 56 serving as a side closer to the outer ring 13, the connecting portion 58 is fixed to the one end of the inner ring 12 in the axis O direction.

The friction disk portion 56 extends towards the outer diameter side as like a flange from the other end of the cylindrical portion 57 in the axis O direction. The friction disk portion 56 is restricted in rotation by being compressed in a thickness direction (axis O direction) by a brake caliper. A corner part of the connecting position of the friction disk portion 56 and the cylindrical portion 57 is formed having a chamfer 59. The chamfer 59 provides clearance between the brake disk 55 and the suspension member 102. A cylindrical space defined by the chamfer 59, the inner periphery of the cylindrical portion 57 and the connecting portion 58 is called an internal space 55s of the brake disk.

The internal space 55s opens to the other side in the axis O direction, and houses the entire inner ring flange 12c. Moreover, the internal space 55s houses the heads of the bolts 18d latched on the other end of the inner ring flange 12c in the axis O direction. Moreover, the internal space 55s houses the heads of the bolts 18, the one end of the suspension member 102 in the axis O direction, the one end of the outer ring 13 in the axis O direction, and one end of the bolt 17 in the axis O direction.

Next describes a specific example of the present invention.

Figure 3:
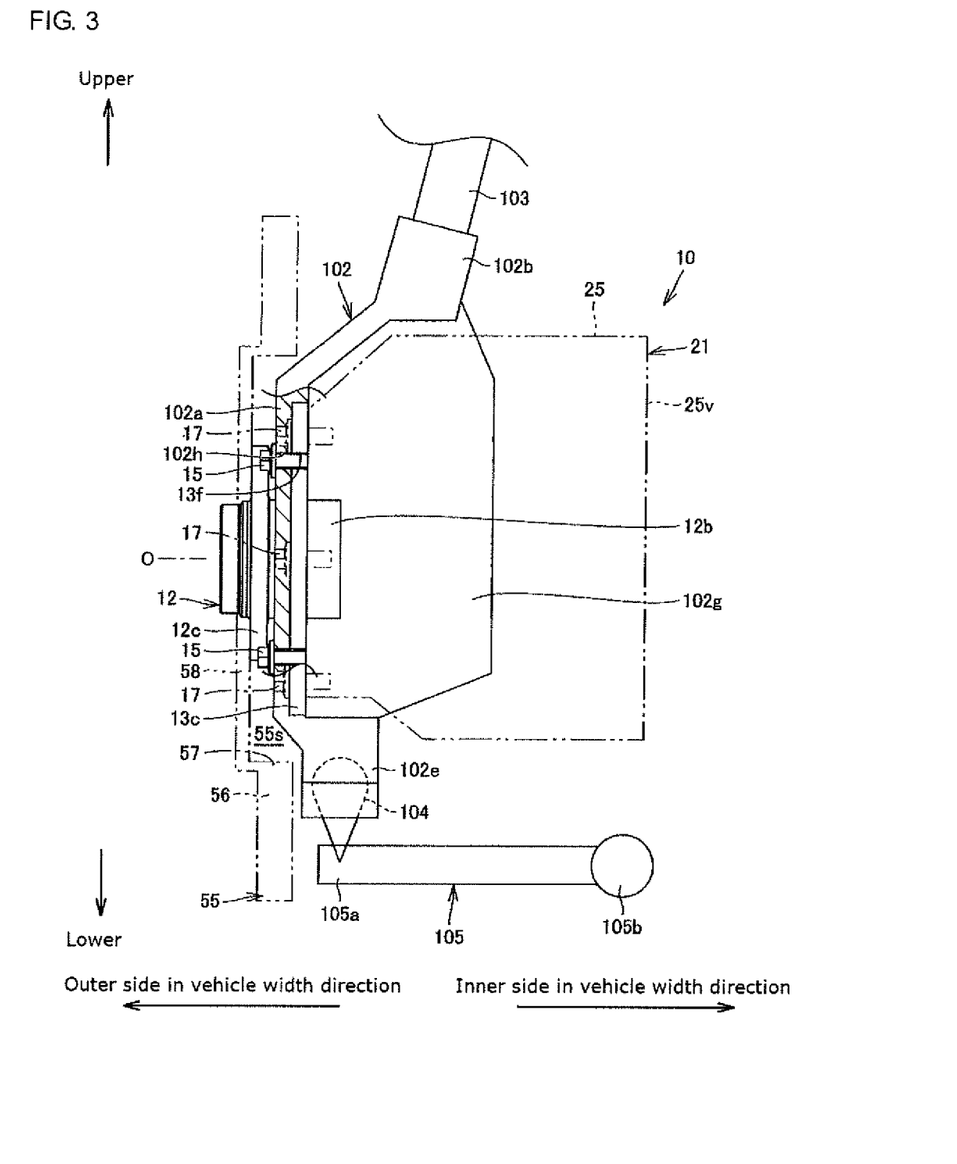
FIG. 3 is a side view schematically showing a wheel hub bearing unit of an in-wheel motor drive device serving as a specific example of the present invention, together with its peripheral components.
Figure 4:
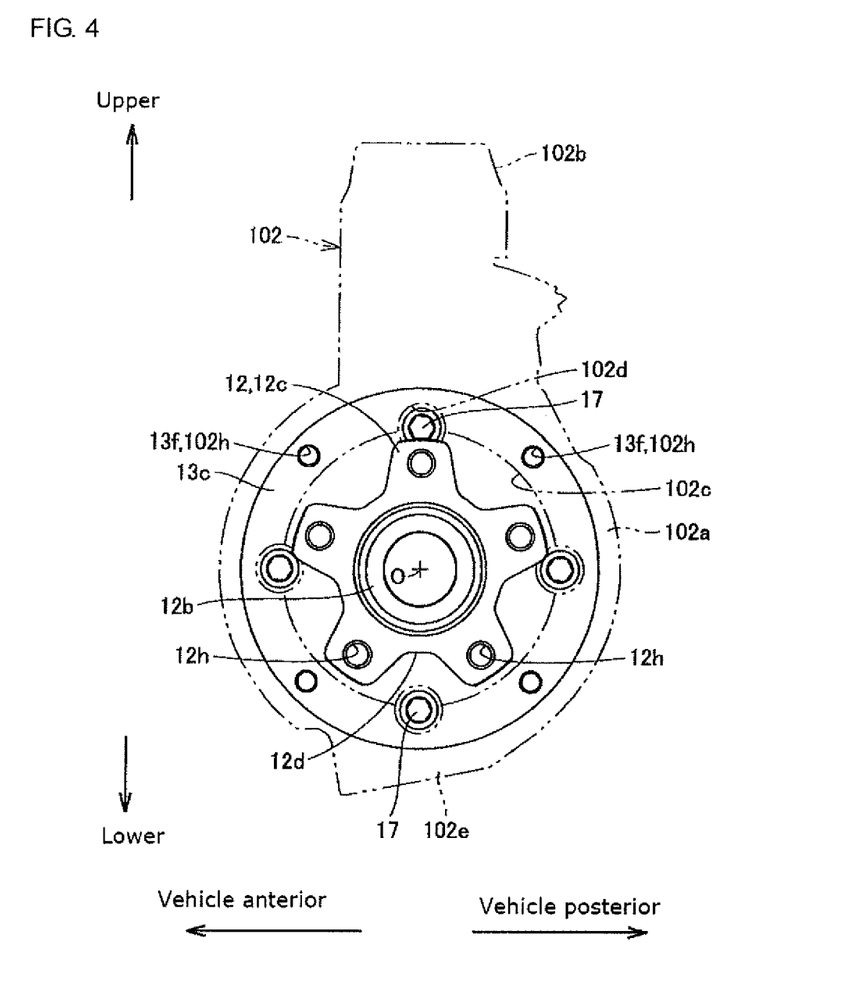
FIG. 4 is a front view schematically showing the wheel hub bearing unit of FIG. 3, together with its peripheral components.

FIG. 3 is a side view schematically showing a wheel hub bearing unit of the specific example together with its peripheral components, and represents a state viewed from a vehicle anterior. FIG. 4 is a side view schematically showing the wheel hub bearing unit of the specific example together with its peripheral components, and represents a state viewed from the outer side in the vehicle width direction. As shown in FIG. 4, a circular opening 102c is formed in a center portion 102a of the suspension member 102. The center of the circular opening 102c matches with the axis O. The center portion 102a is made in a ring shape and is formed having both ends in the vehicle width direction flat.

As shown in FIG. 3, the center portion 102a on the outer side in the vehicle width direction and the outer ring attachment member 13c on the inner side in the vehicle width direction are disposed to overlap in the vehicle width direction. The center portion 102a has a plurality of through-holes 102h formed with intervals in the circumferential direction, so as to surround the circular opening 102c. The outer ring attachment member 13c is a plate material of a circular ring shape, and has a greater diameter than the inner ring flange 12c. As shown in FIG. 3, the outer ring attachment member 13c has female threaded holes 13f formed at predetermined intervals in the circumferential direction, to correspond to the through-holes 102h. Bolts 17 are inserted through the through-holes 102h and female threaded holes 13f.

Bolts 15, the female threaded holes 13f and the through-holes 102h are disposed on the outer diameter side than the disk shaped inner ring flange 12c centered about the axis O. The bolts 15 are inserted into the through-holes 102h from the outer side in the vehicle width direction. The heads of the bolts 15 hold down the suspension member 102 from the outer side in the vehicle width direction. The tip part of the bolts 15 screw to the female threaded holes 13f.

An inner diameter of the circular opening 102c of the suspension member 102 is greater than the outer diameter of the disk-shaped inner ring flange 12c, and the center of the circular opening 102c corresponds to the axis O. Cutouts 102d are formed between adjacent through-holes 102h, 102h. A plurality of the cutouts 102d are provided along an inner edge of the circular opening 102c, with intervals in the circumferential direction. The cutouts 102d are disposed on the outer diameter side than the inner ring flange 12c, and receives the heads of the bolts 17.

As shown by the broken lines in FIG. 3, a height dimension of the heads of the bolts 17 are less than the thickness of the suspension member 102, and the heads of the bolts 17 are housed inside the cutouts 102d as shown in FIG. 4. As such, the bolts 17 are disposed on the inner side in the vehicle width direction than the inner ring flange 12c, and does not interfere with the inner ring flange 12c.

As shown in FIG. 4, the bolts 17 may overlap with the inner ring flange 12c when viewed in the axis O direction. However, cutouts 12d are provided on the outer edges of the inner ring flange 12c, and the bolts 17 are exposed from the cutouts 12d. This secures access to the heads of the bolts 17 from the one side in the axis O direction.

In order to avoid complexity in the drawings, FIG. 3 omits the outer ring tubular member (reference numeral 13b in FIG. 1). Moreover, FIG. 4 omits the bolts passed through the through-holes 102h (reference numeral 15 in FIG. 3).

The suspension member 102 has an upper suspension bracket 102b protruding upwards from the center portion 102a having the circular opening 102c. The upper suspension bracket 102b couples to a lower end of a damper 103 on the inner side in the vehicle width direction than the friction disk portion 56 of the brake disk 55. The damper 103 extends in a vertical direction and an upper end part (not illustrated) of the damper 103 connects with the vehicle body.

The suspension member 102 has a lower suspension bracket 102e protruding downwards from the center portion 102a having the circular opening 102c. The lower suspension bracket 102e connects with an outer end 105a in the vehicle width direction of a lower arm 105 via a ball joint 104. An inner end 105b of the lower arm 105 in the vehicle width direction is pivotably supported to a member on the vehicle body side not illustrated. The lower arm 105 can thus swing in the vertical direction by having the outer end 105a in the vehicle width direction serve as a free end, and the inner end 105b in the vehicle width direction serve as a base end. The ball joint 104 is a free joint, so the lower arm 105 is connected to the suspension member 102c free in direction.

The suspension member 102 has a wall portion 102g extending towards the vehicle anterior from the center portion 102a having the circular opening 102c. As shown in FIG. 3, the wall portion 102g extends vertically with respect to a front-rear direction of the vehicle, and an upper edge of the wall portion 102g integrally couples to the upper suspension bracket 102b. A lower edge of the wall unit 102g couples integrally with the lower suspension bracket 102e. The suspension member 102 is stiffened by the wall portion 102g. The suspension member 102 is preferably made of steel for securing stiffness.

As shown in FIG. 3, at least the heads of the bolts 15 and 17 are disposed in the internal space 55s.

According to the present embodiment, as shown in FIG. 1, the connecting portion 58 of the brake disk 55 is disposed on the one side of the outer ring attachment member 13c in the axis O direction. The bolts 15 that fix the non-rotary suspension member 102 to the outer ring attachment 13c includes a head disposed on the one side of the outer ring attachment member 13c in the axis O direction, and a shank extending from this head to the other side in the axis O direction and which is passed through the female threaded hole 13f formed on the outer ring attachment member 13c and the through-hole formed in the suspension member 102. The bolts 15 are disposed on the inner diameter side than the inner peripheral surface of the cylindrical portion 57, and at least a part of the heads of the bolts 15 is received in the internal space 55s of the cylindrical portion 57.

According to such a present embodiment, at least a part of the bolts 15 that connect and fix the outer ring 13 to the suspension member 102 is received in the internal space 55s of the cylindrical portion 57 of the brake disk; in terms of position in the axis O direction, the brake disk 55 and the bolt 15 are disposed overlapping each other. That is, no clearance needs to be provided in the axis O direction between the friction disk portion 56 of the brake disk 55 and the bolt 15 as conventionally, and allows for shortening the dimension in the axis O direction of the in-wheel motor drive device 10 including the brake disk 55, as compared to the conventional art.

Moreover, according to the present embodiment, the outer ring 13 includes the outer ring tubular member 13b surrounding the other end of the inner ring 12 in the axis O direction and the outer ring attachment member 13c fixed to the outer periphery of the outer ring tubular member 13b, the bolts 15 fix the outer ring attachment member 13c to the non-rotary suspension member 102, and at least one part of the outer ring attachment member 13c is received in the internal space 55s. According to such a present embodiment, in terms of position in the axis O direction, the outer ring attachment member 13c is disposed overlapping the friction disk portion 56 of the brake disk 55; this further allows to reduce the dimension in the axis O direction of the in-wheel motor drive device 10 including the brake disk 55, as compared to the conventional art.

Moreover, according to the present embodiment, the bolts 15 include a head disposed on the one side of the outer ring 13 in the axis O direction, and a shank extending from this head to the other side in the axis O direction and passed through the female threaded hole 13f formed in the outer ring 13 and the through-hole formed in the suspension member 102, and at least a part of the heads of the bolts 15 is received in the internal space 55s. This eliminates the need to provide a clearance in the axis O direction between the friction disk portion 56 of the brake disk 55 and the head of the bolt 15, thus allowing for reducing the dimension in the axis O direction of the in-wheel motor drive device 10 including the brake disk 55 compared to the conventional art.

Moreover, according to the present embodiment, the non-rotary outer ring 13 can be fixed to the non-rotary suspension member 102 with the bolt 15.

Moreover, according to the present embodiment, the non-rotary outer ring 13 can be fixed to the non-rotary body casing 38 with the bolt 17. The bolt 17 has its head directed to the one side in the axis O direction, has its shank directed to the other side in the axis O direction, and one part of its head is received in the internal space 55s.

Figure 5:
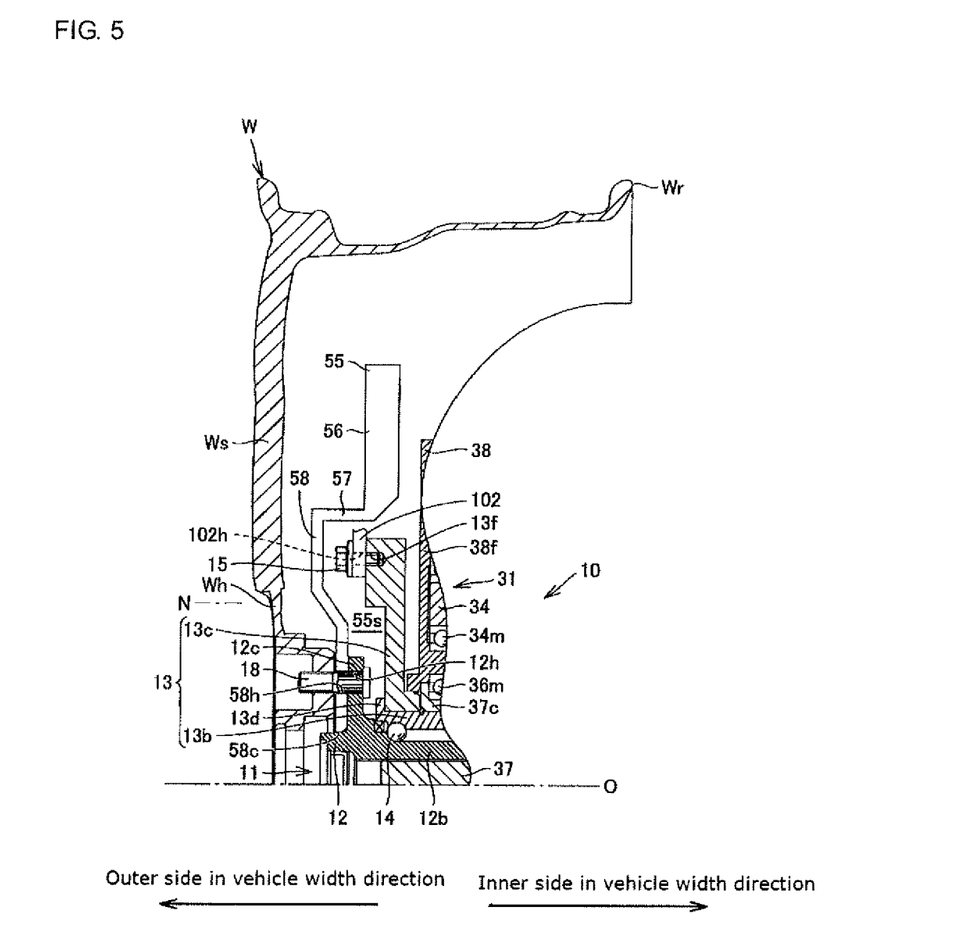
FIG. 5 is a longitudinal sectional view showing a modification of the present invention.

Next describes a modification of the present invention. FIG. 5 is a longitudinal sectional view showing a modification of the present invention. In this modification, configurations common to the aforementioned embodiments are assigned with identical reference numerals and their descriptions are omitted, and different configurations will be described below. In this modification, the entire bolt 15 is received in the internal space 55s. The one end of the suspension member 102 in the axis O direction is connected to contact one end of the outer attachment member 13c in the axis O direction, and protrudes from the one end in the axis O direction. Although the female threaded hole 13f has a bottom, this may not have a bottom.

Although embodiments of this invention are described above with reference to the drawings, this invention is not limited to the illustrated embodiments. Various corrections and modifications can be made to the illustrated embodiments within the same scope or within the equivalent scope of this invention. The internal space 55s can house at least a part of the bolt 15. Moreover, the internal space 55s can house at least a part of the bolt 17. Moreover, the internal space 55s can house at least a one of among a part of the inner ring 12, a part of the outer ring 13, and a part of the suspension member 102.

INDUSTRIAL APPLICABILITY

The in-wheel motor drive device configuring this invention is used advantageously in electric vehicles and hybrid vehicles.

REFERENCE SIGNS LIST

10 In-wheel motor drive device
11 Wheel hub bearing unit
12 Inner ring
12b Inner ring tubular portion
12c Inner ring flange
12r Inner raceway ring,
13 Outer ring
13b Outer ring tubular member
13c Outer ring attachment member
13d Projection
13e Tube portion
13f Female threaded hole
13h Through-hole
14 Rolling element
15,17,18 Bolt
21 Motor unit
31 Reducer unit
38 Body casing
38b Rear part
38f Front part
38g Female threaded hole
55 Brake disk
55s Internal space
56 Friction disk portion
57 Cylindrical portion
58 Connecting portion
58c Center hole
59 Chamfer
102 Suspension member
M,N,O Axis
W Wheel

The invention claimed is:
1. An in-wheel motor drive device comprising:
a wheel hub bearing unit having an outer ring, an inner ring passing through a center hole of the outer ring and protruding from the outer ring to one side in an axial direction, a plurality of rolling elements disposed in double rows in an annular space between the outer ring and the inner ring, and fixing means for fixing the outer ring to a non-rotary member, the non-rotary member being a suspension member;
a motor unit configured to drive the inner ring; and
a brake disk having a connecting portion configured to be connected with one end of the inner ring in the axial direction, a cylindrical portion extending from the connecting portion to the other side in the axial direction and disposed coaxially to the inner ring, and a flange-shaped friction disk portion extending towards an outer diameter from the other end of the cylindrical portion in the axial direction, wherein
the fixing means is a fixing bolt which is disposed at an outer diameter side of the outer ring,
the fixing bolt includes a head disposed on one side of the outer ring in the axial direction, the inner ring includes an inner ring flange on one side of the inner ring in the axial direction,
the inner ring flange is provided with fastening means for receiving a wheel fixing bolt,
the brake disk is fixed to the inner ring flange by the wheel fixing bolt,
the fixing bolt is disposed completely radially outside of the fastening means, and
at least a part of the head of the fixing bolt is received in an internal space of the cylindrical portion of the brake disk.

2. The in-wheel motor drive device according to claim 1, wherein
the outer ring includes an outer ring tubular member configured to surround an other end of the inner ring in the axial direction, and an outer ring attachment member configured to be fixed to an outer periphery of the outer ring tubular member,
the fixing means fixes the outer ring attachment member to the non-rotary member, and
at least a part of the outer ring attachment member is received in the internal space.

3. The in-wheel motor drive device according to claim 1, wherein
the fixing bolt includes a shank extending from the head to the other side in the axial direction and being passed through a hole formed in the outer ring and a hole formed in the suspension member.

\* \* \* \* \*